July 19, 1932.  O. C. MUDD  1,867,981
MECHANICAL MOVEMENT
Filed Aug. 18, 1930
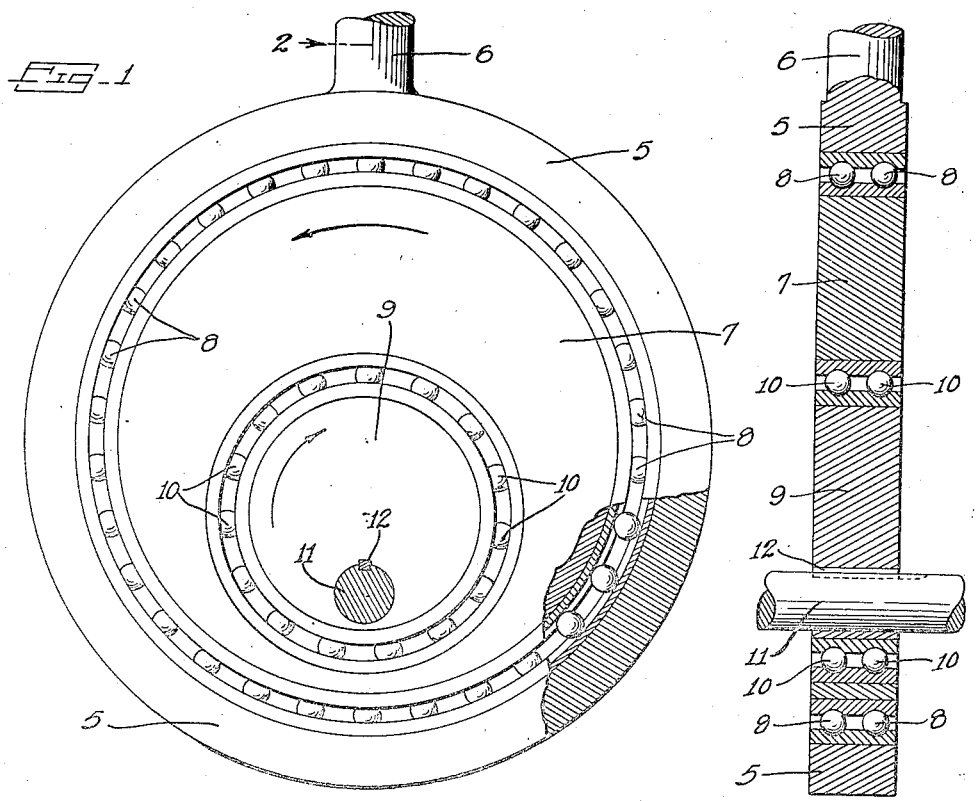
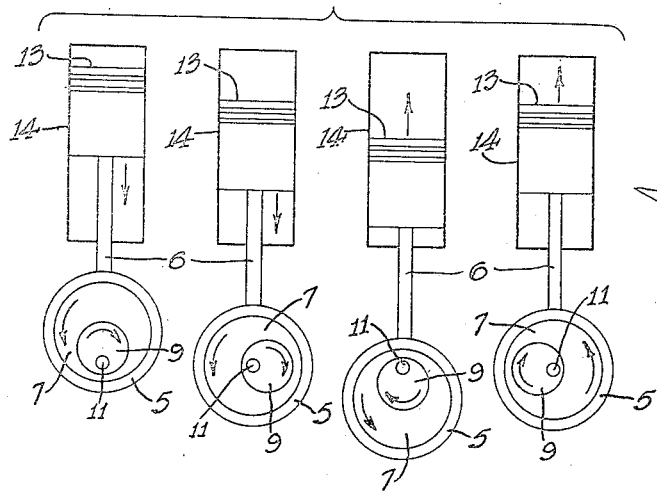
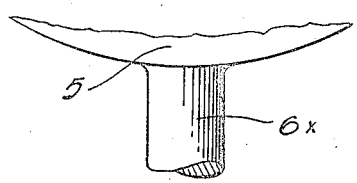
O. C. Mudd
INVENTOR
BY Munn & Co.
ATTORNEYS Patented July 19, 1932

1,867,981

UNITED STATES PATENT OFFICE

ORA C. MUDD, OF EDWARDSVILLE, ILLINOIS

MECHANICAL MOVEMENT

Application filed August 18, 1930. Serial No. 476,137.

My invention relates to improvements in mechanical movements, and it consists in the combinations, constructions, and arrangements herein described and claimed.

An object of my invention is to provide a device for translating reciprocatory motion into rotary motion, or vice versa, and is particularly applicable to engines, such as steam engines, internal combustion engines, and the like, although it may be used with many other devices where it is desired to change from one motion to the other.

One of the main advantages of this invention in connection with engines is the elimination of the wrist pin between the crank and the piston.

A further object is that in the use of the device, the reciprocatory movement of the piston will be a pure harmonic motion, thus eliminating vibration to a great extent.

A further object is to provide a device in which the parts can be so balanced as to eliminate rotational vibration.

Other objects and advantages will appear in the following specification, and the novel features of the invention will be particularly pointed out in the appended claims.

My invention is illustrated in the accompanying drawing, forming part of this application, in which Figure 1 is a side view of the movement, the rotating shaft being shown in section, Figure 2 is a sectional view along the line 2—2 of Figure 1, Figure 3 is a diagrammatic view showing the positions of the pistons and the eccentrics at various portions of the stroke, and Figure 4 is a fragmentary section of a modified form of the device.

Referring particularly to Figure 1, I have shown therein a ring 5 which is preferably made of metal and to which is rigidly secured a piston rod 6. Disposed within the ring is a plate 7 which is rotatable with respect to the ring about the central axis of the latter. In order to provide for free movement and to reduce friction, I arrange a series of ball bearings 8.

The plate 7 has a circular portion cut therefrom and disposed in this circular portion is a plate 9 which is designed to rotate with respect to the plate 7. Ball bearings 10 are provided for facilitating this movement. The plate 9 is rigidly connected to a shaft 11 in any suitable manner, as by means of a key 12. The radius of the circular plate 7 and that of the circular plate 9 are arbitrarily chosen and may be equal to any values within limits of construction, but it is necessary for the purpose of this invention that the distance between the central axis of the plate 7 and the central axis of the plate 9 be equal to the distance between the central axis of the plate 9 and the central longitudinal axis of the shaft 11.

In Figure 3, I have shown a diagrammatic illustration in which the piston rod 6 is connected with a piston 13 in a cylinder 14. For simplicity, I have illustrated an internal combustion engine, but it will be understood that the mechanical movement may be applied to steam engines, air engines, or other fluid-operated devices. In Figure 3, the piston 13 at the left is just starting downward on its power stroke. The plate 7 is rotating in the direction shown by the arrow, while the plate 9 is rotating in the opposite direction. The axis of the shaft 11 maintains a position intersecting the central longitudinal axis of the piston rod 6. The diagrammatic illustrations show the relative positions of the plates 7 and 9 at 90° apart.

This construction permits of a substantially rigid connection with the piston and, as stated, obviates the necessity of the use of a wrist pin. It also eliminates the use of long connecting rods and makes it possible to build engines and other devices of the type with cylinders close to the crankshaft.

In Figure 4, I have shown a modified form in which there is a second piston 6x secured to the ring 5. Such a construction might be used in a gas-driven air compressor, and, due to the elimination of the crank and wrist pin connection, it will be possible to build such units of a much shorter frame.

The provision of a mechanical movement of this type would permit the reduction of crank case size in aeroplane or automobile engines, thus reducing weight and cost.

I claim:

1. The combination of a reciprocable shaft, a rotatable shaft transversely positioned with respect to the reciprocable shaft, a ring member fixedly connected with the reciprocable shaft, a circular member rotatably mounted in the ring member and provided with an eccentrically positioned circular opening, and an eccentric member rotatably mounted in the circular opening of said circular member and fixedly mounted on the rotatable shaft, said circular member and eccentric member being rotatable in opposite directions when the shafts are in motion.

2. The combination of a reciprocable shaft, a rotatable shaft transversely positioned with respect to the reciprocable shaft, a ring member fixedly connected with the reciprocable shaft, a circular member rotatably mounted in the ring member and provided with an eccentrically positioned circular opening, and an eccentric member rotatably mounted in the circular opening of said circular member and fixedly mounted on the rotatable shaft, said circular member and eccentric member being rotatable in opposite directions when the shafts are in motion, the axis extended of the reciprocable shaft being the locus of the centers of the circular member and rotatable shaft when said member and shaft are in motion.

Signed at Alton in the county of Madison, and State of Illinois, this 8th day of August, A. D. 1930.

ORA C. MUDD.